United States Patent
Slobodin

(10) Patent No.: US 7,847,868 B2
(45) Date of Patent: *Dec. 7, 2010

(54) SUBPIXELS OF A LIGHT VALVE PIXEL HAVING CHARACTERISTICS ADAPTED TO COMPLEMENT LIGHT WITHIN A RANGE OF WAVELENGTHS

(75) Inventor: David Elliot Slobodin, Lake Oswego, OR (US)

(73) Assignee: Seiko Epson Corporation, Shinjuku-ku, Tokyo (JP)

( * ) Notice: Subject to any disclaimer, the term of this patent is extended or adjusted under 35 U.S.C. 154(b) by 615 days.

This patent is subject to a terminal disclaimer.

(21) Appl. No.: 11/144,921

(22) Filed: Jun. 3, 2005

(65) Prior Publication Data

US 2006/0187415 A1    Aug. 24, 2006

Related U.S. Application Data

(63) Continuation of application No. 11/060,939, filed on Feb. 18, 2005, now Pat. No. 7,554,623.

(51) Int. Cl.
*G02F 1/1335* (2006.01)

(52) U.S. Cl. ............... 349/8; 349/5; 349/106; 349/107; 349/108; 349/109; 353/31

(58) Field of Classification Search .................. 349/5–8, 349/106–109, 139
See application file for complete search history.

(56) References Cited

U.S. PATENT DOCUMENTS

| | | | | |
|---|---|---|---|---|
| 4,632,514 A | * | 12/1986 | Ogawa et al. | 349/160 |
| 5,085,973 A | * | 2/1992 | Shimizu et al. | 430/271.1 |
| 5,161,042 A | * | 11/1992 | Hamada | 349/62 |
| 5,309,188 A | | 5/1994 | Burstyn | |
| 5,386,306 A | * | 1/1995 | Gunjima et al. | 349/89 |
| 5,398,086 A | | 3/1995 | Nakano | |
| 5,621,550 A | * | 4/1997 | Oku | 349/5 |
| 5,689,321 A | | 11/1997 | Kochi | |
| 5,781,252 A | * | 7/1998 | Gale | 349/8 |
| 5,781,257 A | * | 7/1998 | Gal et al. | 349/57 |
| 5,801,795 A | * | 9/1998 | Ogino | 349/5 |
| 5,852,479 A | * | 12/1998 | Ueda et al. | 349/9 |
| 6,064,452 A | * | 5/2000 | Ogino | 349/57 |
| 6,072,272 A | * | 6/2000 | Rumbaugh | 313/470 |
| 6,081,309 A | * | 6/2000 | Suzuki et al. | 349/106 |
| 6,104,446 A | * | 8/2000 | Blankenbecler et al. | 349/5 |
| 6,147,735 A | * | 11/2000 | Yamazaki et al. | 349/117 |
| 6,151,166 A | | 11/2000 | Matsushita | |
| 6,312,130 B2 | | 11/2001 | Haba | |
| 6,332,684 B1 | * | 12/2001 | Shibatani et al. | 353/31 |

(Continued)

OTHER PUBLICATIONS

USPTO Office Action in U.S. Appl. No. 11/060,939 mailed Jan. 15, 2008.

(Continued)

*Primary Examiner*—David Nelms
*Assistant Examiner*—Thanh-Nhan P Nguyen
(74) *Attorney, Agent, or Firm*—Townsend and Townsend and Crew, LLP

(57) ABSTRACT

An apparatus, system, and method for subpixels of a light valve pixel having characteristics adapted to complement light within certain wavelength ranges are disclosed herein.

19 Claims, 5 Drawing Sheets

U.S. PATENT DOCUMENTS

| | | | |
|---|---|---|---|
| 6,359,719 B1 | 3/2002 | Ori | |
| 6,457,828 B1* | 10/2002 | Hayashi | 353/20 |
| 6,885,418 B2* | 4/2005 | Matsushita et al. | 349/113 |
| 7,139,058 B2* | 11/2006 | Son et al. | 349/141 |
| 7,239,363 B2* | 7/2007 | Park et al. | 349/109 |
| 7,304,697 B2* | 12/2007 | You | 349/69 |
| 7,417,648 B2* | 8/2008 | Credelle | 345/694 |
| 7,492,379 B2* | 2/2009 | Credelle et al. | 345/695 |
| 2003/0122998 A1* | 7/2003 | Iijima et al. | 349/106 |
| 2004/0066471 A1 | 4/2004 | Bierhuizen | |
| 2004/0080479 A1* | 4/2004 | Credelle | 345/88 |
| 2004/0095528 A1* | 5/2004 | Nakamura et al. | 349/106 |
| 2004/0108818 A1* | 6/2004 | Cok et al. | 315/169.3 |
| 2004/0252260 A1* | 12/2004 | Nishida et al. | 349/107 |
| 2005/0083453 A1* | 4/2005 | Nakano et al. | 349/106 |
| 2005/0162600 A1* | 7/2005 | Rho et al. | 349/139 |
| 2005/0169551 A1* | 8/2005 | Messing et al. | 382/260 |
| 2007/0076144 A1* | 4/2007 | Okita et al. | 349/107 |

OTHER PUBLICATIONS

Amendment/Response in U.S. Appl. No. 11/060,939, filed Feb. 29, 2008.

USPTO Office Action in U.S. Appl. No. 11/060,939 mailed May 30, 2008.

Amendment/Response in U.S. Appl. No. 11/060,939, filed Jul. 30, 2008.

USPTO Office Action in U.S. Appl. No. 11/060,939 mailed Oct. 23, 2008.

Amendment/Response in U.S. Appl. No. 11/060,939, filed Jan. 23, 2009.

* cited by examiner

SUBPIXELS OF A LIGHT VALVE PIXEL HAVING CHARACTERISTICS ADAPTED TO COMPLEMENT LIGHT WITHIN A RANGE OF WAVELENGTHS

RELATED APPLICATION

This is a continuation of U.S. patent application Ser. No. 11/060,939 filed on Feb. 18, 2005, now U.S. Pat. No. 7,554,623, titled "Optical Assembly to Provide Complementary Illumination of Subpixels of a Light Valve Pixel."

FIELD OF THE INVENTION

Embodiments of the invention relate generally to the field of projection systems, and more particularly to designs of subpixels of a light valve pixel for use in such systems.

BACKGROUND OF THE INVENTION

Multimedia projection systems have become popular for purposes such as conducting sales demonstrations, business meetings, classroom training, and for use in home theaters. In typical operation, multimedia projection systems receive analog video signals from a video unit and convert the video signals to digital information to control one or more digitally driven light modulators. Depending on the cost, brightness, and image quality goals of the particular projection systems, the light modulators may be of various sizes and resolutions, be transmissive or reflective, and be employed in single or multiple light path configurations.

Many light modulators used in projection and direct viewing systems operate on the basis of polarization. Such light modulators may include reflective or transmissive light valves based on liquid crystal technology. These liquid crystal light valves can produce a high-resolution image by changing the polarization state upon reflection or transmission of incident light. A polarization-analyzing device may then propagate the light from a bright state pixel of the light valve as a display image to be viewed by the human eye or projected onto a viewing screen.

There are several different optical architectures for employing liquid crystal light valves. One variation is a multipath optical architecture that provides a separate path for each of the primary color (red, blue, and green) lights. Polychromatic light is optically divided to provide each of the three pathways with its associated color light. The different color lights are routed through a series of polarization beam splitters, filters, and wave plates to a color-specific light valve. Each of the light valves is controlled with its respective color data in order to manipulate the colored light into image bearing light. The individual pathways are then reconverged into a color image. Although this design produces an acceptable image, the optics required for the color divergence, separate modulation, and reconvergence are expensive and costly to implement.

Another variation is a single-path multimedia projector. This type of projector involves only one light path that is sequentially illuminated with primary colors that time-share the same liquid crystal light valve. One alternative of this architecture employs a light source to produce polychromatic light rays, which are then directed through color filter segments of a color wheel. This filtering out of the nonselected color provides resource waste that could increase power consumption or decrease the brightness of the projected image.

Another alternative of the single-path multimedia projector employs monochromatic solid-state light sources, such as light-emitting diodes, to selectively emit the primary colors. This alternative requires expensive color combining optics in order to make the three color light beams coaxial before illuminating the liquid crystal light valve. Also, because the solid-state light sources are pulsed at 1/3 duty ratio the lumens/watt efficiency drops as the drive current increases.

A promising alternative to the above-mentioned optical architectures involves a microlens array that is optically coupled with the liquid crystal light valve. This microlens array receives the primary colored light along three ranges of incident angles and focuses the primary colors onto separate subpixels of each individual pixel. The subpixels can simultaneously and selectively modulate the individual colors in order to transmit a colored image. The promises of the microlens alternative, however, are tempered by inefficiencies due to light processing characteristics of prior art systems. These inefficiencies may result directly or indirectly from color separation, polarization filtering, and/or underfilling the subpixels.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include an optical assembly adapted to provide complementary illumination to subpixels of light valve pixel, and methods practiced thereon.

Various aspects of the illustrative embodiments will be described using terms commonly employed by those skilled in the art to convey the substance of their work to others skilled in the art. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components such as prisms, mirrors, lenses, integration elements, etc. may be used as appropriate to fold, bend, or modify the illumination for the intended application. Integration of these optical components into illustrated embodiments may not be specifically addressed unless it is necessary to develop relevant discussion of embodiments of the present invention.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
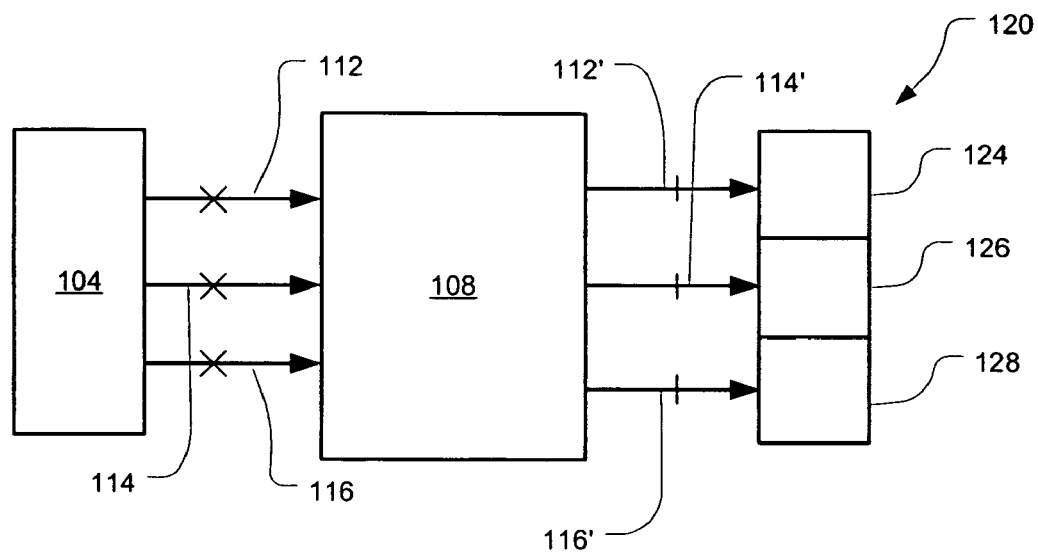
FIG. 1 is a simplified block diagram of an illumination module, optical assembly, and a pixel, in accordance with an embodiment of the present invention.

FIG. 1 illustrates a simple block diagram of an optical architecture 100, in accordance with an embodiment of the present invention. In brief, an illumination module 104 may provide randomly polarized light to an optical assembly 108. Randomly polarized light may be indicated in the figures by Xs in the optical paths. The randomly polarized light may be in the form of colored illumination bundles 112, 114, and 116. Each of the illumination bundles 112, 114, and 116 may include a first and a second polarization state, e.g., a P-polarized portion and a, largely orthogonal, S-polarized portion. The optical assembly 108 may include components adapted to receive the illumination bundles 112, 114, and 116 and transmit, e.g., the P-polarized portions 112', 114', and 116' to a light valve pixel 120. P-polarized light may be indicated in the figures by short transverse lines in the light paths, suggesting a polarization vector in the plane of the drawing sheet.

In one embodiment, the illumination bundles 112, 114, and 116 may each be of a primary color such as red, green, or blue. In this embodiment, the pixel 120 may be a liquid crystal pixel with selectively controlled electrodes designed to spatially address subpixels 124, 126, and 128. The electrodes, and thereby the corresponding subpixels, may be activated with corresponding color data such that the colored illumination bundles 112', 114', and 116' are selectively passed on, in desired portions, as image bearing light. The portions of the illumination bundles 112', 114', and 116' that are passed on as image bearing light may then coalesce into a colored image upon display.

The optical assembly 108 may also include components adapted to process the illumination bundles 112, 114, and 116 so that the transmitted illumination bundles 112', 114', and 116' complement characteristics of the subpixels 124, 126, and 128. In one embodiment, the illumination bundles 112', 114', and 116' may provide complementary illumination by being presented to the subpixels 124, 126, and 128 in a manner to increase the overall light transmission through the respective subpixels 124, 126, and 128. Providing complementary illumination in such a manner to the subpixels may increase the overall brightness, efficiency, and/or contrast of the optical architecture 100.

In one embodiment, the optical architecture 100 may also include a polarizing analyzer behind the pixel 120 (not shown) to filter out stray polarized light, thereby potentially enhancing the contrast of the displayed image. Analyzers and polarizing filters can also be placed in other locations of the optical architecture 100 as may be appropriate for a particular application or illumination module.

In one embodiment the illumination module 104 may include a polychromatic light source such as a gaseous discharge lamp (e.g., high-pressure mercury, tungsten, halogen, or metal halide). In this embodiment, reflective color filters (e.g., a dichroic interference filter) or refractive based color separating devices (e.g., a prism) may be used to separate the light into the desired colors for presentation to the corresponding subpixel. In other embodiments, monochromatic solid-state light sources such as, for example, light-emitting diodes, may be used to produce light of the desired color.

Figure 2:
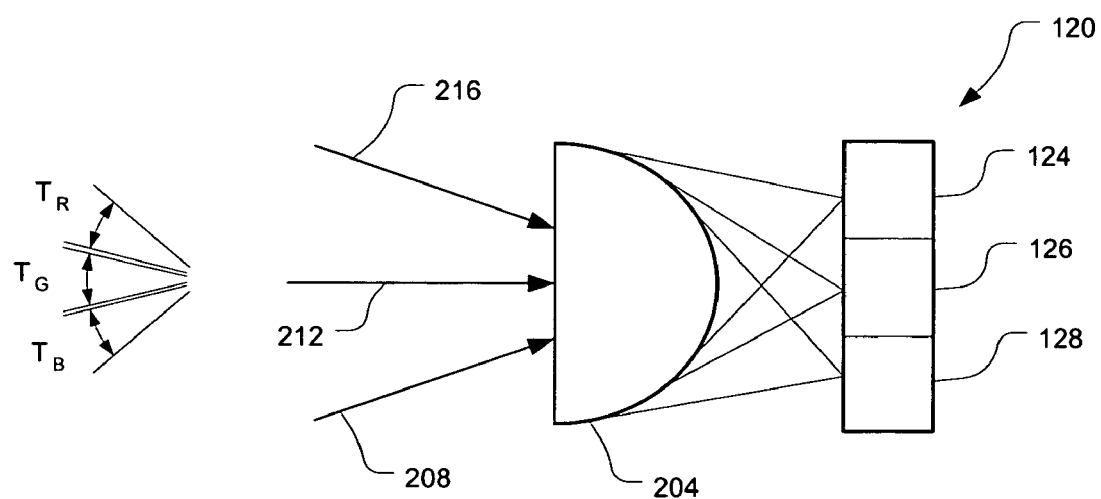
FIG. 2 illustrates a side view of a lens focusing light on subpixels, in accordance with an embodiment of the present invention.

FIG. 2 illustrates a side view of a lens 204 that may be used to present angular color separated (ACS) illumination to the pixel 120. The lens 204, which may be included in the optical assembly 108, may be designed such that illumination that is incident upon the lens 224 within predetermined ranges of incident angles are focused on specific areas of the pixel 120. For example, in one embodiment illumination bundles that have incident angles within a range $\Theta_R$ may be subsequently focused on the subpixel 128; illumination bundles that have incident angles within a range $\Theta_G$ may be subsequently focused on the subpixel 126; and finally, illumination bundles that have incident angles within a range $\Theta_B$ may be subsequently focused on a third subpixel 124. Therefore, in one embodiment red, green, and blue illumination bundles 216, 212, and 208, respectively, may be simultaneously focused on subpixels 128, 126, and 124, respectively, for selective transmission.

Figure 3:
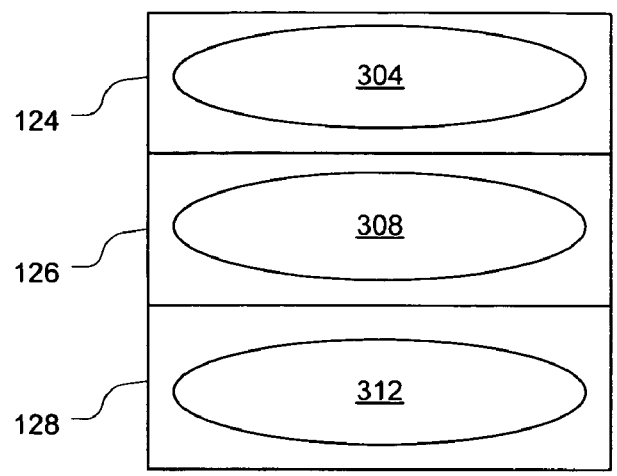
FIG. 3 illustrates the illumination incident upon subpixel apertures, in accordance with an embodiment of the present invention.

In one embodiment, the lens 204 may be adapted to anamorphically illuminate the subpixels 124, 126, and 128 in order to complement characteristics of the subpixels such as the angular transmission distribution and/or the aspect ratio of the subpixels. FIG. 3 illustrates the subpixels 124, 126, and 128 being anamorphically illuminated in accordance with an embodiment of the present invention. In this embodiment, each of the subpixels 124, 126, and 128 may have a rectangular aspect ratio with an elongated dimension in, e.g., the horizontal direction. The incident illumination bundles 208, 212, and 216 may be transmitted through the lens 204 and focused upon the subpixels 124, 126, and 128, respectively, with an elongated axis that complements the rectangular apertures. This may result in elliptical illumination areas 304, 308, and 312 presenting a substantial portion of the illumination to the transmittable region of the respective subpixels.

Figure 10:
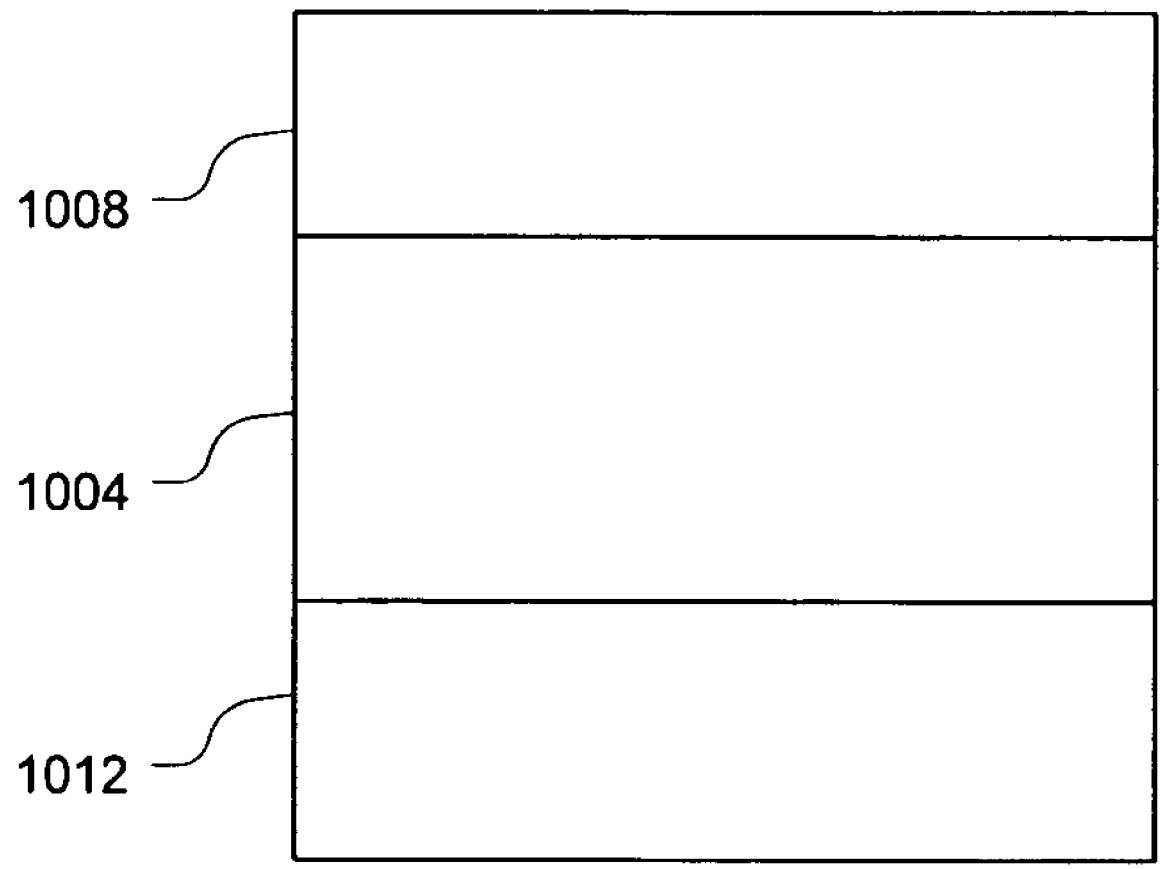
FIG. 10 illustrates the illumination incident upon subpixel apertures with difference characteristics, in accordance with another embodiment of the present invention.

In one embodiment each of the subpixels 124, 126, and 128 may have similar characteristics. However, in other embodiments the subpixels 124, 126, and 128 may have different characteristics. In one embodiment, different subpixel characteristics may be designed to complement the spectral properties of the light that the particular subpixel is adapted to receive. For example, in one embodiment in order to achieve a desired color balance, more illumination of one color, e.g., green, may be required than from other colors, e.g., blue and red. In this embodiment, as illustrated in FIG. 10, a subpixel that is to receive a green illumination bundle, e.g., subpixel 1004, may have a larger rectangular aspect ratio than the other subpixels, e.g., subpixels 1008 and 1012, to allow for a greater portion of green illumination to be transmitted.

The lens 204 may be one of an array of lenses that are arranged to illuminate a corresponding array of pixels. In various embodiments, the lenses and the pixels may have a one-to-one, a one-to-plurality, or a plurality-to-one correspondence. In one embodiment, the lens array may be an array of lenticular lens elements. In this embodiment, each of the lenticular lens elements may illuminate a corresponding row of pixels.

Figure 4:
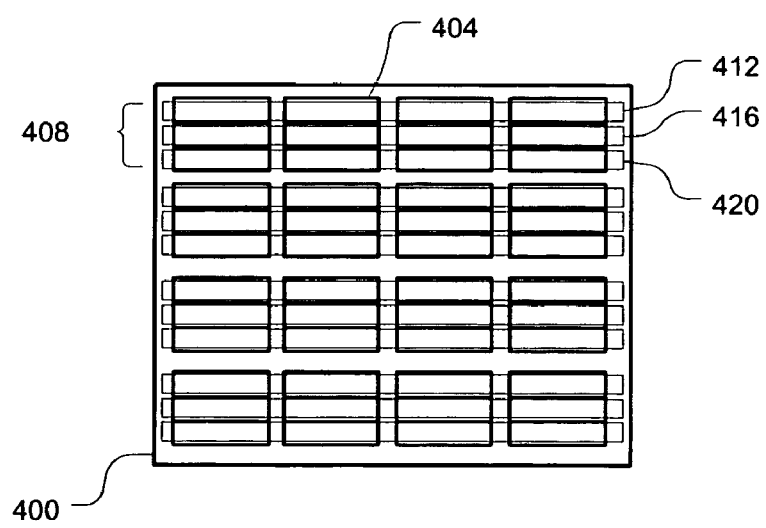
FIG. 4 illustrates illumination incident upon a number of pixels of a light valve display, in accordance with another embodiment of the present invention.

FIG. 4 illustrates a light valve display 400 being illuminated in accordance with an embodiment of the present invention. In this embodiment, the light valve display 400 may have an array of light valve pixels 404. Each light valve pixel 404 may have a number of selectively controlled subpixels, similar to the pixel 120 discussed above. In this embodiment, illumination bundles may be focused onto the display 400 through a lenticular lens array (not shown) with the resulting lenticular illumination 408 being striped across the face of the display 400. The lenticular illumination 408 may include distinct illumination bundles 412, 416, and 420 that are a result from the lenticular array being illuminated with ACS illumination, as discussed above. The distinct illumination bundles 412, 416, and 420 may provide complementary illumination to the subpixels of the pixels 404.

Figure 5:
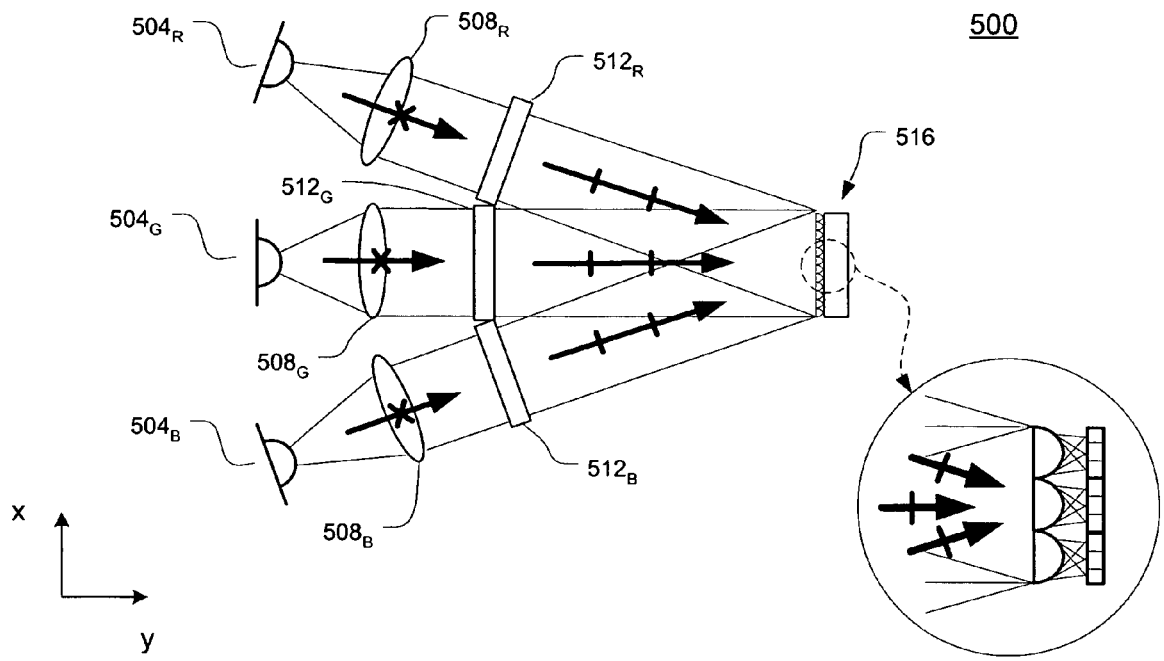
FIG. 5 illustrates a side view of an optical architecture with angular color separated illumination, in accordance with an embodiment of the present invention.

FIG. 5 illustrates a side view of an optical architecture 500 with ACS illumination, in accordance with an embodiment of the present invention. In this embodiment, an illumination module may include solid-state light sources $504_R$, $504_G$, and $504_B$, such as light-emitting diodes, to produce illumination bundles of primary colors, e.g., red, green, and blue, respectively. In one embodiment collimating optics $508_R$, $508_G$, and $508_B$ may placed in each of the illumination paths to receive diverging illumination bundles from the light sources $504_R$, $504_G$, and $504_B$ and transmit illumination bundles that contain substantially parallel light rays. In various embodiments, the collimating optics $508_R$, $508_G$, and $508_B$ may include one or more collimating lenses.

In one embodiment reflective polarizers $512_R$, $512_G$, and $512_B$ may be positioned in the various illumination paths to allow for light of one polarization state, e.g., P-polarization, to be transmitted while reflecting light of a substantially orthogonal polarization state, e.g., S-polarization. In other embodiments a converse arrangement and/or other polarization states may be used. The reflective polarizers $512_R$, $512_G$, and $512_B$ could include, but are not limited to, a wire-grid polarizer, a cholesteric polarizer, a polymer film stack, or a dielectric coating stack. The reflective polarizers $512_R$, $512_G$, and $512_B$ may each be a portion of a reflective polarizer or, alternatively, may be separate reflective polarizers.

The transmitted polarized light may then illuminate a microlensed display 516 across a range of illumination angles. The microlensed display 516 may include an array of lenses optically coupled to a light valve display, as discussed above with reference to earlier embodiments.

Figure 6:
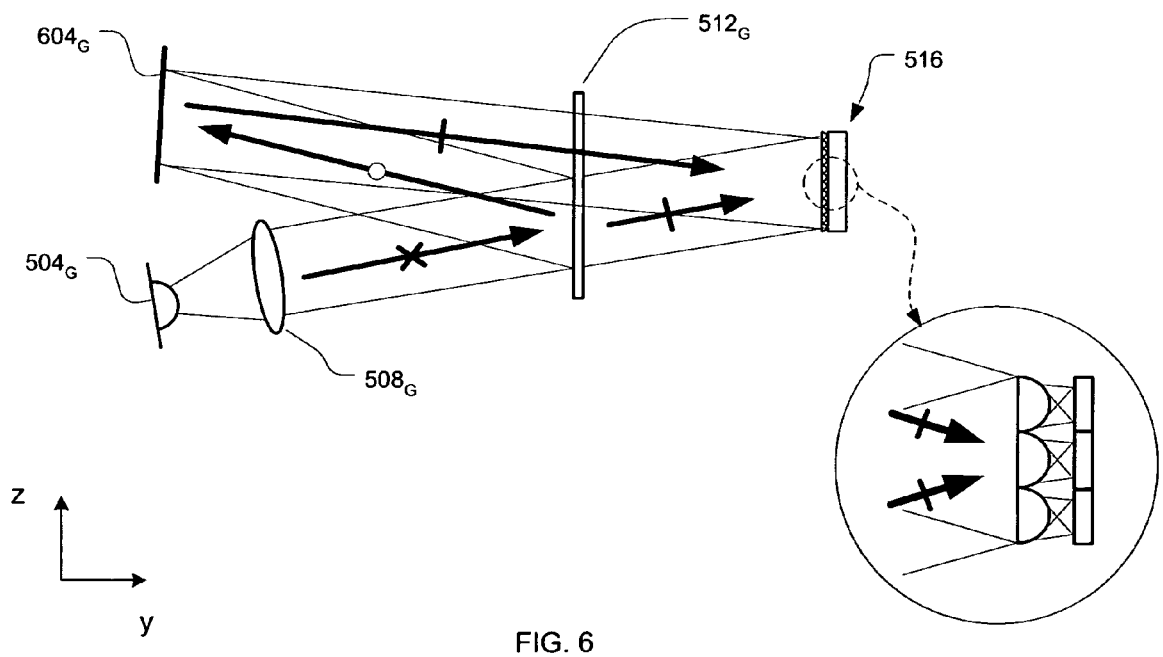
FIG. 6 illustrates a top view of an optical architecture with a polarization recycling assembly, in accordance with an embodiment of the present invention.

As described above, the reflective polarizers $512_R$, $512_G$, and $512_B$ may only allow P-polarized light to be transmitted so that the microlensed display 516 may properly manipulate the polarization of the light for selective transmission. FIG. 6 illustrates a top view of an embodiment of the optical architecture 500 that may provide for the recycling of the S-polarized light. In this embodiment, the light-emitting device $504_G$ may transmit an illumination bundle of randomly polarized light towards the reflective polarizer $512_G$. The P-polarized portion of the illumination bundle may be transmitted through the reflective polarizer $512_G$ and illuminate the microlensed display 516 along a primary optical path 604.

In this embodiment, S-polarized light may be reflected from the reflective polarizer $512_G$ towards a recycling assembly $604_G$. S-polarized light may be indicated in the figures by small circles in the light paths suggesting a polarization vector normal to the plane of the drawing sheet. The light-emitting device $504_G$ may be non-orthogonal to the reflective polarizer $512_G$ to facilitate an angled reflection.

The recycling assembly $604_G$, which may include a polarization rotation device and a reflecting device, may rotate the S-polarized illumination bundle to the P-polarization state and redirect it towards the reflective polarizer $512_G$. In various embodiments, the polarization rotation device may be quarter-wave plate or a quarter-wave film on the reflecting device. The recycled illumination bundle with the rotated polarization state may then be transmitted through the reflective polarizer $512_G$ and illuminate the microlensed display 516 along a recycling optical path 612.

Referring again to FIG. 5, in one embodiment the reflective polarizers 512 may be designed in a manner to reflect the S-polarized portions of the illumination bundles back towards the horizontal planes that the originating light sources are on. In this context, the horizontal plane may be a level plane normal to the plane of the drawing sheet. For example, the S-polarized portion of the illumination bundle originating from light-emitting device $504_G$ may be reflected towards a recycling assembly $604_G$ that is on the same horizontal plane as the light-emitting device $504_G$. This may, in turn, facilitate the presentation of the recycled illumination within the desired range of incident angles at the microlensed display 516.

Figure 7:
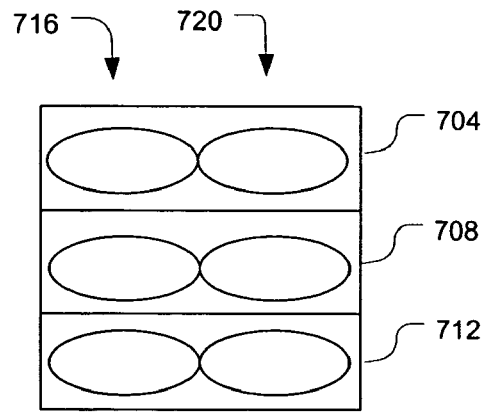
FIG. 7 illustrates the illumination incident upon subpixel apertures, in accordance with an embodiment of the present invention.

FIG. 7 illustrates a pixel 700 overlaid with illumination from the primary optical path 604 and the recycling optical path 612, in accordance with an embodiment of the present invention. In this embodiment, the pixel 700 may have subpixels 704, 708, and 712 similar to those of the pixel 120 discussed above. Each of the subpixels 704, 708, and 712 may include primary hot spots 716 resulting from the illumination bundles impinging upon the pixel 700 along the primary optical paths 604 and recycled hot spots 720 resulting from the illumination bundles along the recycling optical paths 612. Developing the optical architecture to present these illumination bundles in a side-by-side manner as shown may complement characteristics of subpixels such as the rectangular aspect ratio and/or angular transmission distribution.

Although the above embodiment illustrates an optical architecture producing two, substantially elliptical, illumination bundles incident upon the light valve pixel, other embodiments may not be so limited. For example, other embodiments may include three illumination bundles presented to the subpixel side-by-side-by-side, in order to take advantage of the geometrical transmissivity properties of the subpixel.

Figure 8:
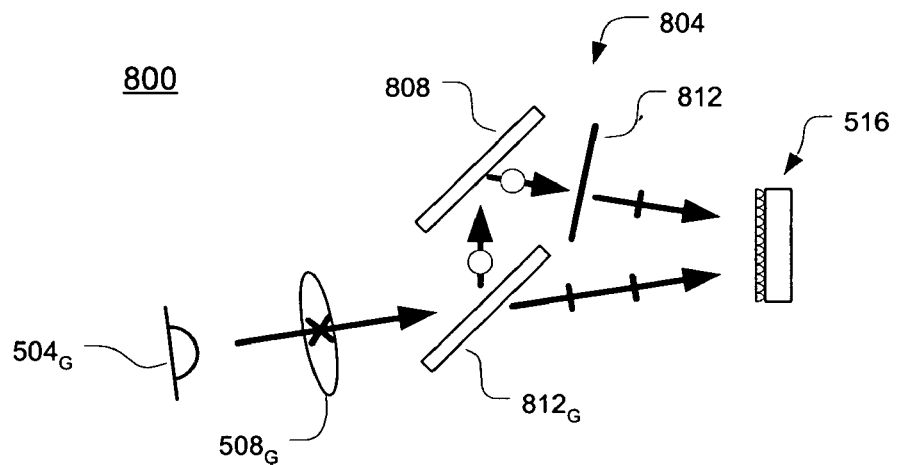
FIG. 8 illustrates a top view of an optical architecture with a polarization recycling assembly, in accordance with another embodiment of the present invention.

FIG. 8 illustrates an optical architecture 800 employing a recycling assembly 804 in accordance with another embodiment of the present invention. For simplicity, FIG. 8 illustrates only the polarization states along the optical paths of the optical architecture 800 and not the light rays. In this embodiment, illumination bundles may travel from the light-emitting device $504_G$, through the collimating lens $508_G$, and be incident upon the reflective polarizer $512_G$, in a manner similar to the embodiment depicted and discussed with reference to FIG. 6. However, in the present embodiment, the S-polarized portion may be reflected towards a reflective device 808. The reflective device 808 may redirect the S-polarized portion through a polarization rotation device 812, e.g., a half-wave plate or film. The polarization rotation device 812 may rotate the S-polarized light to the P-polarization state and transmit the light to the microlensed display 516.

Figure 9:
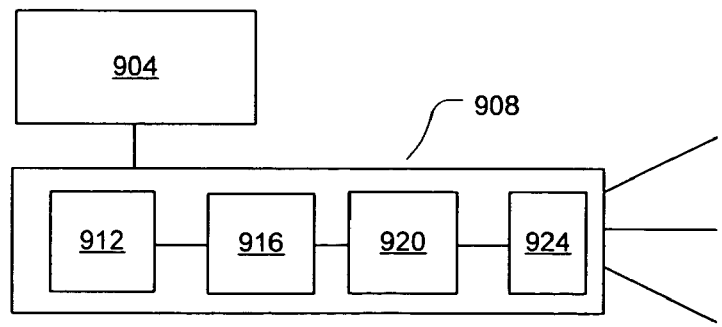
FIG. 9 is a simplified block diagram of a projection system in accordance with an embodiment of the present invention.

FIG. 9 is a simplified pictorial plan view of a system including a video unit 904 coupled to a projection device 908, in accordance with an embodiment of the present invention. In this embodiment the video unit 904 may transmit video signals to the projection device 908, which may include an illumination module 912 optically coupled to an optical assembly 916. The optical assembly 916 may provide light to a light modulator 920 that may in turn present image bearing light to projection optics 924. The components of the projection device 908 may cooperate with one another to jointly effectuate rendering of desired images, which may be image frames of a video, based on the transmitted video signals.

The video unit 904 may include a personal or laptop computer, digital versatile disk (DVD), set-top box (STB), video camera, video recorder, an integrated television tuner, or any other suitable device to transmit video signals to the projection device 908. In various embodiments, the system may be, for example, a projector or a projection television.

In one embodiment, the light modulator 920 may be, e.g., a liquid crystal light valve. Examples of these types of light valves include, but are not limited to reflective displays such as LCoS (Liquid Crystal on Silicon) as well as transmissive displays, such as thin film transistor (TFT), polysilicon (P—Si), and Silicon-on-Insulator (SOI). In one embodiment, the light modulator 920 may include a liquid crystal display that may include a number of individually controllable subpixels similar to the pixels 120 or 700 described in reference to earlier embodiments.

The optical assembly 916 may include an array of lenses optically coupled to the array of pixels of the light modulator 920. The optical assembly 916 may also include optics adapted to present the primary colored light to the lens array along three ranges of incident angles. The lens array may then focus the primary colors onto the subpixels being controlled with the corresponding primary colored image data based on the transmitted video signals.

Importantly, while embodiments of the present invention are described with reference to a video projector, the embodiments discussed herein are equally applicable to any type of illumination system for a polarization-based display, whether for projection or direct viewing, whether compact or not. For example, the techniques described herein are thought to be useful in connection with computer and data device displays, television and movie projectors, internet appliance viewers, and entertainment systems for video and game players.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
    a first subpixel, of a light modulator pixel, having a surface with a rectangular aspect ratio adapted to complement light within a first wavelength range received at the surface of the first subpixel;
    a second subpixel, of the light modulator pixel, having a surface with a rectangular aspect ratio adapted to complement light within a second wavelength range received at the surface of the second subpixel, the rectangular aspect ratio of the surface of the first subpixel being different than the rectangular aspect ratio of the surface of the second subpixel, the first wavelength range being different from the second wavelength range;
    a third subpixel of the light modulator pixel, having a surface with a rectangular aspect ratio adapted to complement light within a third wavelength range received at the surface of the third subpixel;
    present a first portion of light within the first wavelength, having a first polarization state, to a first section of the first subpixel,
    rotate a second portion of light within the first wavelength, having a second polarization state, to the first polarization state, and
    present the second portion of light within the first wavelength, after said rotation, to a second section of the first subpixel, wherein the first section and the second section of the first subpixel are at least partially non-overlapping sections distributed along a major axis of the first subpixel;
    wherein each of the first, second and third subpixels has a first side that is opposite to a second side, and a third side that is opposite to a fourth side; and
    wherein the second side of the first subpixel is adjacent to the first side of the second subpixel, and wherein the second side of the second subpixel is adjacent to the first side of the third subpixel.

2. The apparatus of claim 1, wherein the rectangular aspect ratio of the surface of the first subpixel is greater than the rectangular aspect ratio of the surface of the second subpixel.

3. The apparatus of claim 2, wherein the first wavelength range corresponds to green light.

4. The apparatus of claim 1, wherein the first wavelength range corresponds to green light, the second wavelength range corresponds to blue light, and the third wavelength range corresponds to red light.

5. The apparatus of claim 1, wherein each of the third and fourth sides of each of the first, second and third subpixels are not adjacent to any sides of any of the first, second and third subpixels.

6. The apparatus of claim 1, wherein the first and second sides of each of the first, second and third subpixels are substantially equal in length.

7. The apparatus of claim 1, wherein the third side of the first subpixel is different in length than the third side of the second and/or third subpixel.

8. The apparatus of claim 1, wherein the first, second and third subpixels are arranged such that the first subpixel is adjacent to the second subpixel, the second subpixel is adjacent to the third subpixel, and the first subpixel is not adjacent to the third subpixel.

9. The apparatus of claim 1, wherein the light modulator pixel is a first light modulator pixel, and wherein the apparatus further comprises:
    a fourth subpixel of a second light modulator pixel that is adjacent to the first light modulator pixel, the fourth subpixel having a surface with a rectangular aspect ratio adapted to complement light within the first wavelength range received at the surface of the fourth subpixel; and
    a fifth subpixel, of the second light modulator pixel, having a surface with a rectangular aspect ratio adapted to complement light within the second wavelength range received at the surface of the fifth subpixel,
    and a sixth subpixel of the second light modulator pixel, having a surface with a
    rectangular aspect ratio adapted to complement light within the third wavelength range received at the surface of the sixth subpixel,
    wherein the first subpixel is adjacent to the fourth subpixel, the second subpixel is adjacent to the fifth subpixel, and the third subpixel is adjacent to the sixth subpixel.

10. A system comprising:
an illumination module adapted to produce a first illumination bundle within a first wavelength range and a second illumination bundle within a second wavelength range;
a light modulator pixel having
  a first subpixel including a surface with a rectangular aspect ratio adapted to complement light within the first wavelength range received at the surface of the first subpixel;
  a second subpixel including a surface with a rectangular aspect ratio adapted to complement light within the second wavelength range received at the surface of the second subpixel, the rectangular aspect ratio of the surface of the second subpixel being different than the rectangular aspect ratio of the surface of the first subpixel; and
  a third subpixel including a surface with a rectangular aspect ratio adapted to complement light within a third wavelength range received at the surface of the third subpixel,
a projection lens, adapted to receive and project the modulated first and second illumination bundles; and
an optical assembly optically coupled to the illumination module and to the light modulator pixel and adapted
  to receive the first and second illumination bundles from the illumination module,
  to present a first portion of the first illumination bundle and a first portion of the second illumination bundle, each having a first polarization state, to the surfaces of the first and second subpixels, respectively,
  to rotate a second portion of the first illumination bundle and a second portion of the second illumination bundle, each having a second polarization state, to the first polarization state, and
  to present the second portions of the first and second illumination bundles to the surfaces of the first and second subpixels, respectively;
wherein each of the first, second and third subpixels have a first side that is opposite to a second side, and a third side that is opposite to a fourth side; and
wherein the second side of the first subpixel is adjacent to the first side of the second subpixel, and wherein the second side of the second subpixel is adjacent to the first side of the third subpixel.

11. The system of claim 10, wherein the first subpixel is adapted to receive and modulate the first illumination bundle and the second subpixel is adapted to receive and modulate the second illumination bundle.

12. The system of claim 10, wherein the illumination module, light modulator pixel, and projection lens comprise a projection device and the system further comprises:
a video unit adapted to output a video signal to the projection device, the projection device adapted to project a video based at least in part on the video signal.

13. The system of claim 12, wherein the video unit is selected from a group consisting of a digital versatile disk (DVD), a set-top box, a video recorder, and an integrated television tuner.

14. The system of claim 10, wherein the optical assembly further comprises:
a lens adapted
  to receive the first illumination bundle within a first range of incident angles and to focus the first illumination bundle on or about the surface of the first subpixel; and
  to receive the second illumination bundle within a second range of incident angles and to focus the second illumination bundle on or about the surface of the second subpixel.

15. The system of claim 14, wherein the light modulator pixel is one of an array of light modulator pixels and the lens is one of an array of lenses optically coupled to the array of light modulator pixels.

16. The system of claim 15, wherein the array of lenses comprises a lenticular array.

17. The system of claim 10, wherein the illumination module includes a solid-state light source.

18. A method comprising:
producing first, second, and third illumination bundles within first, second, and third wavelength ranges, respectively;
presenting a first portion of the first illumination bundle, a first portion of the second illumination bundle, and a first portion of the third illumination bundle, each having a first polarization state, to surfaces of first, second, and third subpixels of a light modulator pixel, respectively, the surface of the first subpixel having a rectangular aspect ratio adapted to complement light within the first wavelength range, the surface of the second subpixel having a rectangular aspect ratio adapted to complement light within the second wavelength range, and the surface of the third subpixel having a rectangular aspect ratio adapted to complement light within the third wavelength range, the rectangular aspect ratio of the surface of the first subpixel being different than the rectangular aspect ratio of the surface of the second subpixel;
rotating a second portion of the first illumination bundle, a second portion of the second illumination bundle, and a second portion of the third illumination bundle, each having a second polarization state, to the first polarization state; and
presenting the second portions of the first, second and third illumination bundles to the surfaces of the first, second and third subpixels, respectively;
wherein each of the first, second and third subpixels have a first side that is opposite to a second side, and a third side that is opposite to a fourth side; and
wherein the second side of the first subpixel is adjacent to the first side of the second subpixel, and wherein the second side of the second subpixel is adjacent to the first side of the third subpixel.

19. The method of claim 18, further comprising modulating the first illumination bundle with the first subpixel; and modulating the second illumination bundle with the second subpixel.

* * * * *